(12) United States Patent
Weinberg et al.

(10) Patent No.: US 6,257,059 B1
(45) Date of Patent: Jul. 10, 2001

(54) MICROFABRICATED TUNING FORK GYROSCOPE AND ASSOCIATED THREE-AXIS INERTIAL MEASUREMENT SYSTEM TO SENSE OUT-OF-PLANE ROTATION

(75) Inventors: Marc S. Weinberg, Needham; Jonathan J. Bernstein, Medfield; Gregory A. Kirkos, Somerville; Tommy W. Lee, Wilmington; Anthony Petrovich, Tewksbury, all of MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/405,721

(22) Filed: Sep. 24, 1999

(51) Int. Cl.$^7$ ................................................ G01C 19/00
(52) U.S. Cl. ................................................ 73/504.16
(58) Field of Search .................... 73/504.02, 504.12, 73/504.15, 504.16, 510; 310/370

(56) References Cited

U.S. PATENT DOCUMENTS 5,016,072 * 5/1991 Greiff ...................................... 357/26
5,757,103 * 5/1998 Lee et al. ............................... 310/309

* cited by examiner

Primary Examiner—Richard A. Moller
(74) Attorney, Agent, or Firm—Weingarten, Schurgin, Gagnebin & Hayes LLP

(57) ABSTRACT

A micromechanical tuning fork gyroscope has an input axis out of the plane of the structure. In one embodiment, capacitor plates are provided in parallel strips beneath two apertured, planar proof masses suspended from a substrate by a support structure. The proof masses are paired and set in opposed vibrational motion by an electrostatic comb drive. In response to an input angular rate about the out-of-plane input axis, the proof masses translate with respect to the striped capacitors, thereby varying the capacitance between the capacitor strips and the proof masses as a function of the input rate. In another embodiment, proof mass combs of a comb drive are meshed between fixed drive combs which are electrically excited in pairs 180° out of phase. As the proof masses translate in response to an angular input, the distance between the proof mass combs and the fixed combs varies, thereby varying the capacitance between the combs resulting in an unbalanced voltage on the proof masses that is detected as an indication of input rate. The out-of-plane tuning fork gyroscope can be combined with two in-plane tuning fork gyroscopes to provide a complete three-axis inertial measurement unit from a single wafer or on a single chip.

34 Claims, 12 Drawing Sheets

MICROFABRICATED TUNING FORK GYROSCOPE AND ASSOCIATED THREE-AXIS INERTIAL MEASUREMENT SYSTEM TO SENSE OUT-OF-PLANE ROTATION

BACKGROUND OF THE INVENTION

The present invention relates to microfabricated tuning fork gyroscopes.

Microfabrication enables mechanical gyroscopes and other devices to be constructed using batch fabrication techniques known for fabricating solid state electronics. These techniques result in instruments of smaller size, lower cost, and greater reliability than those constructed by conventional techniques.

Micromechanical tuning fork structures are known for use as inertial rate sensors. Known tuning fork structures typically sense angular rate along an axis in-plane with a major planar surface of a substrate on or in which the device is constructed. One such device is an in-plane tuning fork gyroscope, which employs meshing drive and driven finger electrodes or combs associated with two vibrating tuning fork elements or proof masses.

The fabrication of such known devices is fairly straightforward, involving photolithographic and other semiconductor fabrication techniques. For damping and cross-coupling reasons, the plates of such known devices may be made with holes or apertures. Some fabrication sequences such as polysilicon and bulk silicon require the holes to enhance under cut etching. However, such devices are known and configured to sense only angular rates imposed in the plane of the major planar surface of the proof mass(es), and not for sensing angular rate about an axis perpendicular to the major plane of the substrate. Mechanical fixturing and wire bonding to sense angular rate about an axis perpendicular to the major plane of the substrate, and/or to realize a three axis system from known in-plane tuning fork gyroscope configurations is expensive and cumbersome.

Other relatively sophisticated micromechanical configurations are known for sensing out-of-plane angular rates. U.S. Pat. No. 5,016,072 to Greiff describes a double gimbal gyroscope structure which senses out-of-plane angular rates. However, the processing required to achieve such a double gimbal structure is not compatible with the processing required to achieve the referenced in-plane structures. Thus, realization of a three axis inertial measurement unit on a single chip would be difficult and perhaps commercially impracticable.

BRIEF SUMMARY OF THE INVENTION

The present invention defines the structure for a microfabricated out-of-plane tuning fork gyroscope which senses angular rate about an axis perpendicular to a major plane of the substrate upon which the device is constructed. The out-of-plane tuning fork gyroscope is fabricated by processing similar to and compatible with that of the referenced in-plane tuning fork gyroscope, making construction of a three axis angular rate sensor on a single chip viable.

In a first embodiment, the out-of-plane tuning fork gyroscope incorporates a striped capacitor readout having two apertured proof masses and electrodes in the form of first and second sets of strips deposited on a substrate below (or above) the apertures in the proof masses. A comb drive causes each proof mass to vibrate in the major plane, typically in opposition. The vibrating proof masses are compliant in an axis parallel to the major plane of the substrate but different from the vibration axis, and translate along the axis in response to an angular rate or acceleration input about an axis normal to the substrate. As the proof masses translate, the apertures cover the electrode strips to varying relative degrees, so that the capacitance between the proof masses and each set of electrodes increases and decreases in proportion to the differential axial position of the proof masses and hence to the input angular rate.

In a further embodiment, the meshing finger electrodes of the comb drive are used for both drive and angular rate sensing. Fixed combs are arranged in electrically isolated pairs 180° out of phase. As the proof masses translate in response to an out-of-plane angular rate input, the distance between the combs on the proof masses and the fixed combs varies, varying the capacitance. The combs can be driven with a voltage at the drive axis resonance frequency to provide both drive and sense operation.

The sensitivity of the out-of-plane tuning fork gyroscope approaches that of the in-plane tuning fork gyroscope for a given proof mass size and separation of resonant frequencies.

In a further embodiment, the out-of-plane tuning fork gyroscope incorporates a center motor that is split into two halves for common mode rejection of electrical coupling, which can cause gyroscope errors.

The microfabrication process of the out-of-plane tuning fork gyroscope is compatible with that of the in-plane tuning fork gyroscope, so that both types of devices can be made on the same silicon wafer or even the same chip. Thus, a complete inertial measurement unit, having three axes of rate and three axes of acceleration, can be built on a single silicon substrate.

BRIEF DESCRIPTION OF THE SEVERAL VIEWS OF THE DRAWING

The above and other features of the present invention are more fully set forth below in the detailed description of illustrative embodiments, and the accompanying drawing of which.

DETAILED DESCRIPTION OF THE INVENTION

Figure 1:
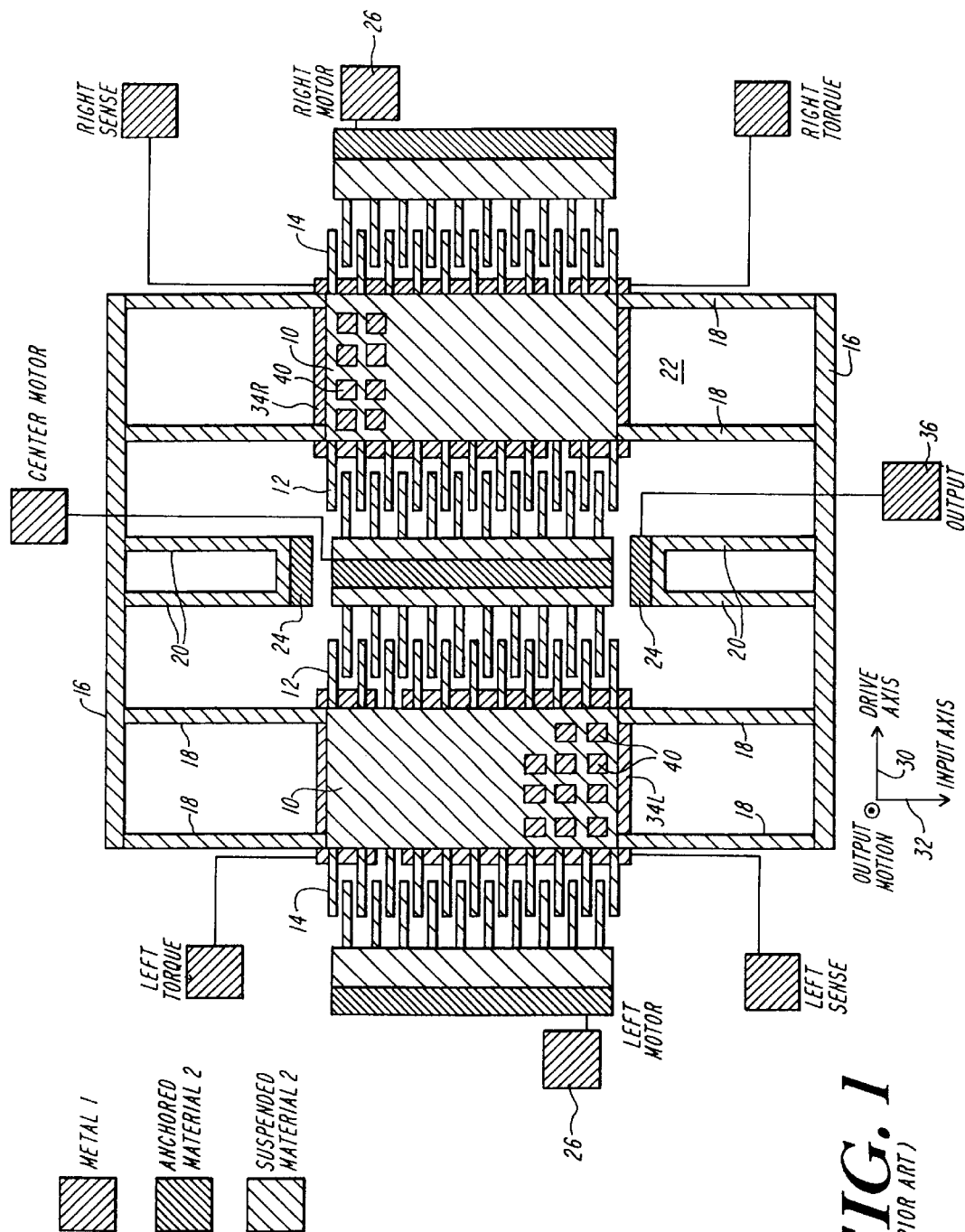
FIG. 1 is a schematic diagram of a prior art in-plane tuning fork gyroscope.

As illustrated in FIG. 1, a prior-art in-plane tuning fork gyroscope includes vibrating elements in the form of proof masses 10 and combs 12, 14. The proof masses 10 may have holes or apertures 40 therein, only some of which are shown in FIG. 1 for clarity. The proof masses 10 and combs 12, 14 are supported on an assembly including supporting members or beams 16, flexures 18 connecting the proof masses 10 to the supporting members 16, and flexures 20 that connect the supporting members 16 to a substrate 22 at anchor points 24. The proof masses 10, supporting members 16, and flexures 18 and 20 are indicated as Suspended Material 2 on FIG. 1, and may be formed from metal, doped silicon, silicon, or polysilicon in the illustrated embodiment.

The outer combs 14 are excited with a DC bias and an AC drive signals via contact pads 26 to cause the proof masses 10 to vibrate in opposition along a drive axis 30. Optionally, the outer combs 14 are driven at half the mechanical resonant frequency with no bias, or at two different frequencies.

The inner combs 12 are used to sense the vibration motion of the proof masses for use in a self-drive oscillator circuit, not shown in FIG. 1.

For the in-plane tuning fork gyroscope of FIG. 1, an angular rate in the plane of the substrate 22 along an input axis 32 causes Coriolis forces which move one proof mass 10 up and the other down along an output motion axis that is normal to the substrate 22. The motion of each proof mass 10 causes a change in the capacitance between the proof mass 10 and a corresponding aligned electrode plate 34L, 34R on the substrate 22. The plates 34L, 34R are driven by AC sense signals used to detect the changing capacitance. For example, the right plate 34R may be excited with 100 Khz, phase angle 0°, while the left plate 34L is excited with 100 kHz, phase angle 180°. Other frequencies and DC can be used also. The differential AC current from the proof masses 10 at the output node 36 is proportional to the input angular rate.

The configuration of the suspension in the tuning fork gyroscope of FIG. 1, that is, the thickness, length, and width of the suspension members 16, 18, and 20, can be selected to achieve a desired in-plane sensitivity appropriate for intended uses of the device.

Figure 2:
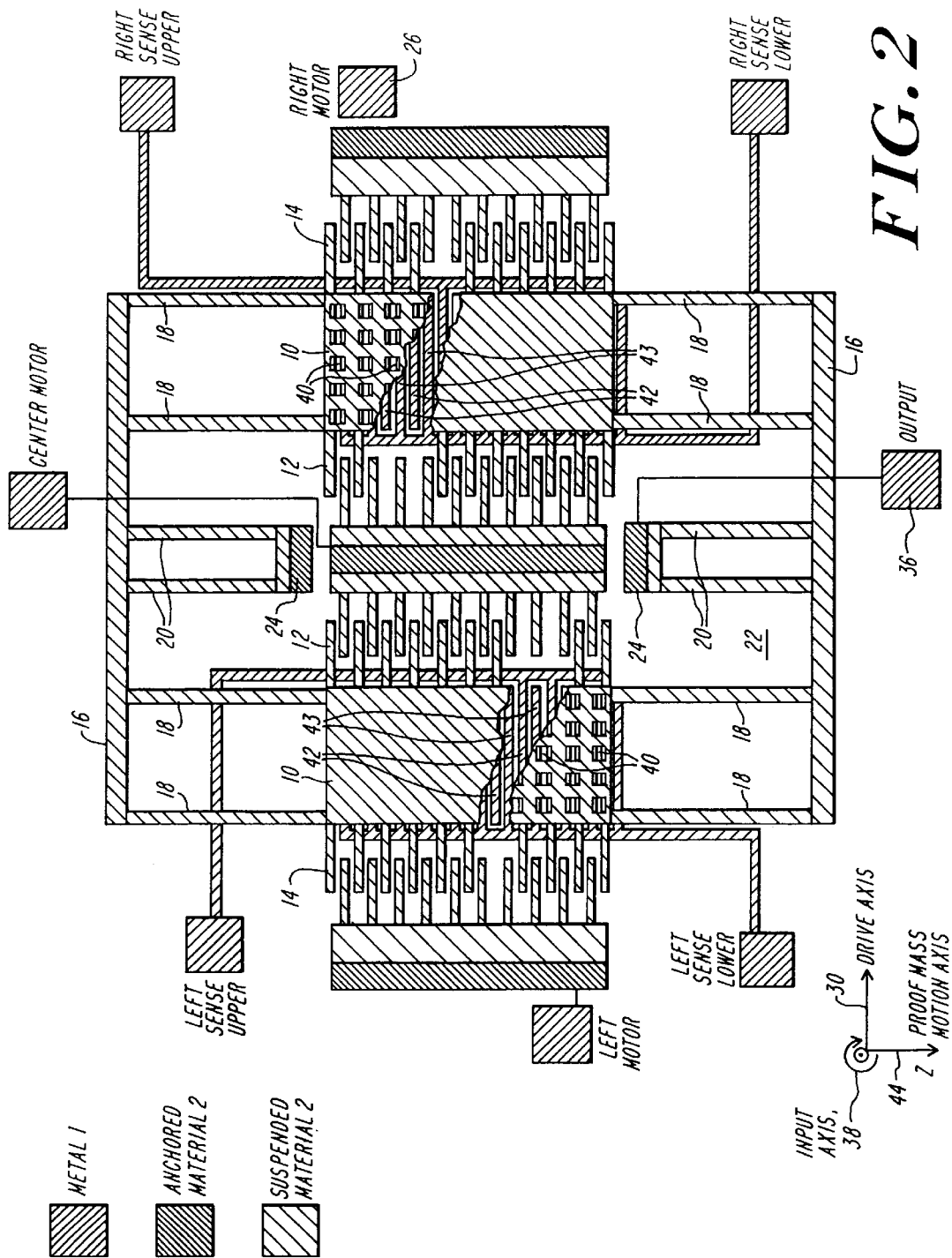
FIG. 2 is a schematic diagram of an out-of-plane tuning fork gyroscope according to the present invention.
Figure 3:
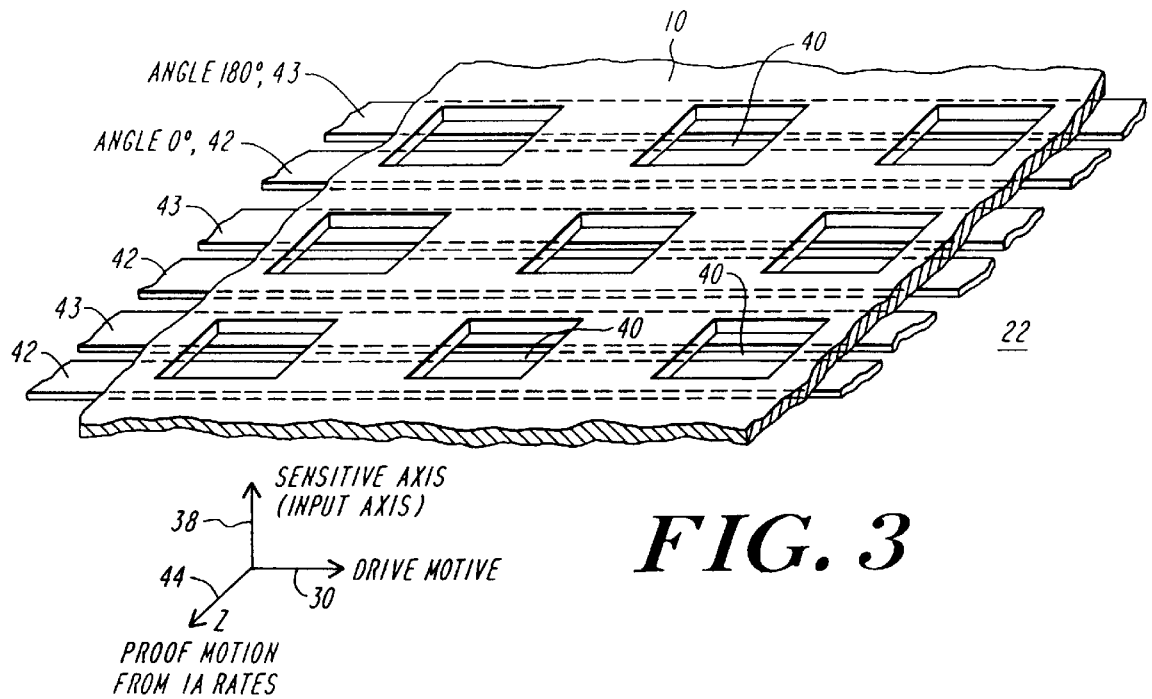
FIG. 3 is a schematic diagram of part of a striped capacitor readout in the tuning fork gyroscope of FIG. 2.

In FIG. 2, the elements of an out-of-plane tuning fork gyroscope that correspond to similar elements of the in-plane gyroscope of FIG. 1 are referred to using the same reference numbers. The gyroscope of FIG. 2 employs a striped capacitor readout in place of the plates 34L, 34R. The striped capacitor readout includes electrodes formed in paired strips 42, 43 on the substrate 22. The strips 42, 43 are formed parallel to the drive axis 30 below the proof masses 10. The pitch, or distance between corresponding points, of the apertures 40 along a proof mass motion axis 44 (discussed below) is substantially the same as that of the pairs of strips 42, 43. To maximize the sensitivity, the edges of the apertures 40 lie over the conductive strips 42, 43, as is shown more particularly in FIG. 3. The strips 42, 43 may be formed by metallization on the substrate surface or by diffusion regions in the substrate.

The structure shown in FIG. 2 is compliant along a Z axis 44 parallel to the substrate 22. As in the prior-art tuning fork gyroscope of FIG. 1, the thickness, length, and width of the suspension members 16, 18 and 20 can be selected to achieve a desired out-of-plane sensitivity. An angular rate about an input axis 38 orthogonal to the substrate causes one proof mass to translate along +Z and the other along −Z. This axial motion causes changes in the capacitance between the capacitor strips 42, 43 and the proof masses 10 as the apertures 40 cover the strips 42, 43 to varying relative degrees. One set of capacitor plates 42 is excited with, for example, a DC voltage and frequency of 50 to 500 kHz at 0° phase angle, and the other set of capacitor strips 43 at 180° phase angle. Other frequencies can be used also. Also, the set of capacitor strips 42, 43 beneath one proof mass 10 are oppositely excited from the set of capacitor plates 42, 43 beneath the other proof mass 10. Accordingly, the current sensed from the output node 36 is proportional to the differential axial position of the two proof masses 10 and, hence, to the input angular rate. The greater the number of capacitor strips 42, 43, the greater the sensitivity to the input angular rate.

A portion of the strips 42, 43 can be dedicated to torque rebalancing if desired. The torque rebalancing may be accomplished as taught in the prior art.

The sensitivity of the striped capacitor out-of-plane tuning fork gyroscope can range from 30 to 100 percent of the sensitivity of the in-plane tuning fork gyroscope for a given proof mass size and separation of resonant frequencies. Neglecting fringing fields, the capacitance between parallel, rectangular plates is described by:

$$C = \frac{\varepsilon L w}{h} 1 \quad (1)$$

where C=capacitance;
$\varepsilon$=dielectric constant;
L=length of plates;
w=width of plates; and
h=gap between plates.

When the plates are moved apart, capacitance varies as:

$$\frac{\partial C}{\partial y} = -\frac{\varepsilon L}{h}\left(\frac{w}{h}\right) 2 \quad (2)$$

When the gap is held constant and the motion is parallel to edge w, the change in capacitance with displacement y is:

$$\frac{\partial C}{\partial x} = \frac{\varepsilon L}{h} 3 \quad (3)$$

With the striped pattern, the sensitivity is multiplied by the number of active edges and a factor of ½ to account for the fact that the holes do not cross the proof mass completely and for fringing fields. The number of active edges is $2w/L_p$ from FIG. 3. Therefore:

$$\frac{\partial C}{\partial x} = \frac{\varepsilon L}{h}\left(\frac{w}{L_p}\right) 4 \quad (4)$$

where $L_p$=center-to-center spacing of holes along w.

In gyroscope operation, readout sensitivity is proportional to the change in capacitance and the excitation voltage. The excitation voltage is proportional to the snap down voltage. The snap down voltage is a DC voltage which brings the proof mass into the sense electrodes and is given by:

$$V_{snap} = \sqrt{\frac{8h^3 k_t}{27\varepsilon A}} 5 \quad (5)$$

where $k_t$=spring stiffness-translation normal to plane; and
A=area of opposing capacitor plates.

In a typical tuning fork gyroscope, $L_p \sim 10 \mu m$ and $h \sim 3 \mu m$. The opposing area for the striped geometry is 50% that of the normal capacitors of the in-plane tuning fork gyroscope. From Equations (2), (4), and (5), the sensitivity of the striped capacitor readout should be 45% that of the present in-plane tuning fork gyroscope.

The widths and lengths of the beams and flexures can be chosen to optimize the axial compliance, so that the resonance of the sense motion approximates that of the tuning fork drive. The resonances of both the sense and drive are independent of the thickness of the proof mass and beams (if all are the same thickness). This independence could make matching of sense and drive axis resonant frequencies easier in the out-of-plane tuning fork gyroscope than in the in-plane tuning fork gyroscope. As device processing has improved, thicker beams and flexures have become possible, so that the sensitivity of the out-of-plane gyroscope can approach or even exceed that of the in-plane gyroscope.

In a further embodiment of the present invention, the out-of-plane tuning fork gyroscope incorporates a dual function drive which uses meshing finger electrodes or combs 50, 52 for both drive and angular rate sensing, obviating the need for capacitor plates located below the proof masses 10. This dual-function drive is illustrated schematically in FIG. 4. Fixed combs 50, 52 are arranged in pairs, the combs in each pair being electrically isolated from each other. One comb 50 of each pair is excited with a carrier, for example, at 100 kHz, at 0° phase angle. The other comb 52 of each pair is excited with a carrier at 180° phase. Other frequencies and DC can be used also. As shown, the outer, or 180°, combs 52 are each attached to a long footing 54. The inner, or 0°, combs 50 are each attached to the substrate 22 at anchors 51 in a space 56 defined between the long footing 54 and two 180° combs 52. The phase angle of the combs could be reversed if desired, such that the 180° combs form the inner combs. Electrical connection to the inner combs 50 may be accomplished through a conductive lead 58 underneath the outer combs 52. The lead out of the inner combs may also be parallel to the combs and cross under the long footing 54.

The combs 60 extending from the proof mass 10 lie between each tooth of a pair of the fixed combs 50, 52. An angular rate about the out-of-plane or input axis 38 causes the proof mass 10 to move axially along axis 44 as described above. This axial motion varies the distance and thus the capacitance between the proof mass comb 60 and the fixed combs 50, 52, so that the current flowing through the proof mass output node 36 (shown in FIG. 2) is proportional to the input angular rate.

The combs 50, 52 can be driven with bias and voltage at the drive axis resonance to realize the dual functions of drive and sense operation. Similarly, by applying a DC bias and 100 kHz, the combs can excite the drive axis motion and detect sense axis displacement. The combs may also be segmented so that some are used only for rate sensing while others are used only for drive or drive sensing.

Figure 4:
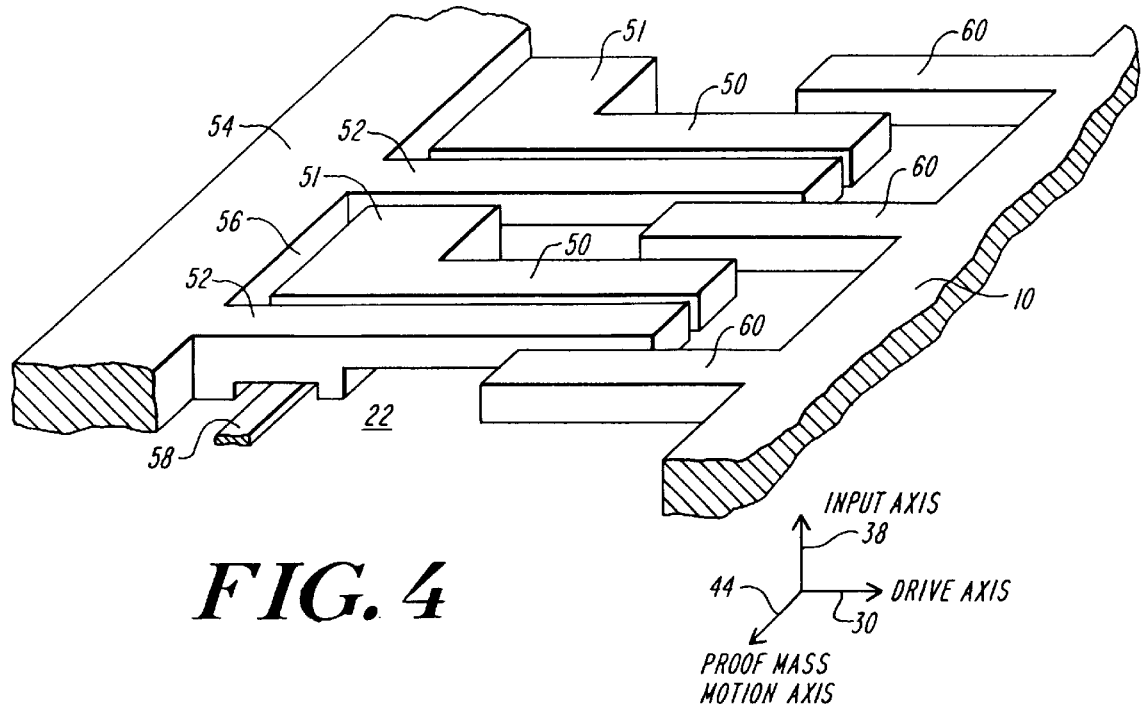
FIGS. 4–6 are schematic diagrams of alternative capacitive readouts for an out-of-plane tuning fork gyroscope according to the present invention.

The dual function combs 50, 52 of FIG. 4 can also be used in a "differential" mode in which both combs are used to sense displacement along the motion axis 44. This read out is used with polysilicon depositions with sacrificial etch, which offer sound, small-area anchors.

Figure 5:
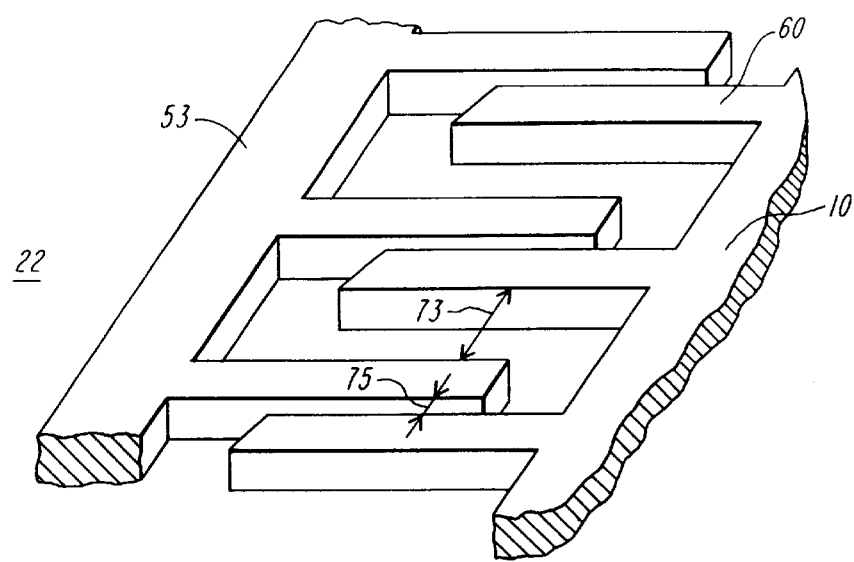
Figure 6:
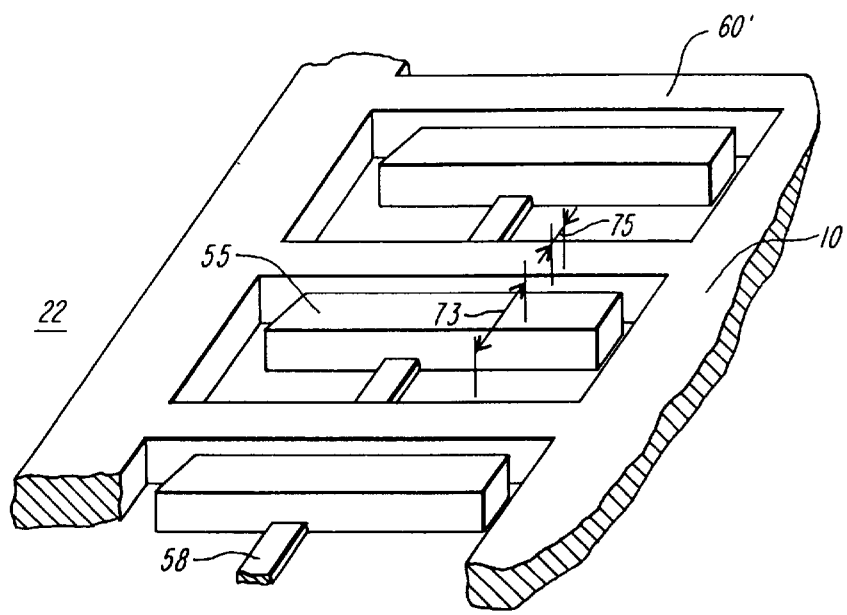

FIGS. 5 and 6 show alternative structures for the sense combs in a gyroscope like that of FIG. 4. The embodiment of FIG. 5 has gaps 73 and 75 of unequal size between each tooth of a fixed comb 53 affixed to the substrate 22 and the two adjacent teeth of a proof mass comb 60. Likewise, the embodiment of FIG. 6 has gaps 73' and 75' of unequal size between each fixed tooth 55 and the two adjacent strips of a ladder-like proof mass comb 60'. The teeth 55 are connected by a conductive lead 58. Typically the fixed comb 53 or the fixed teeth 55 are driven by a DC or AC voltage signal.

Figure 7:
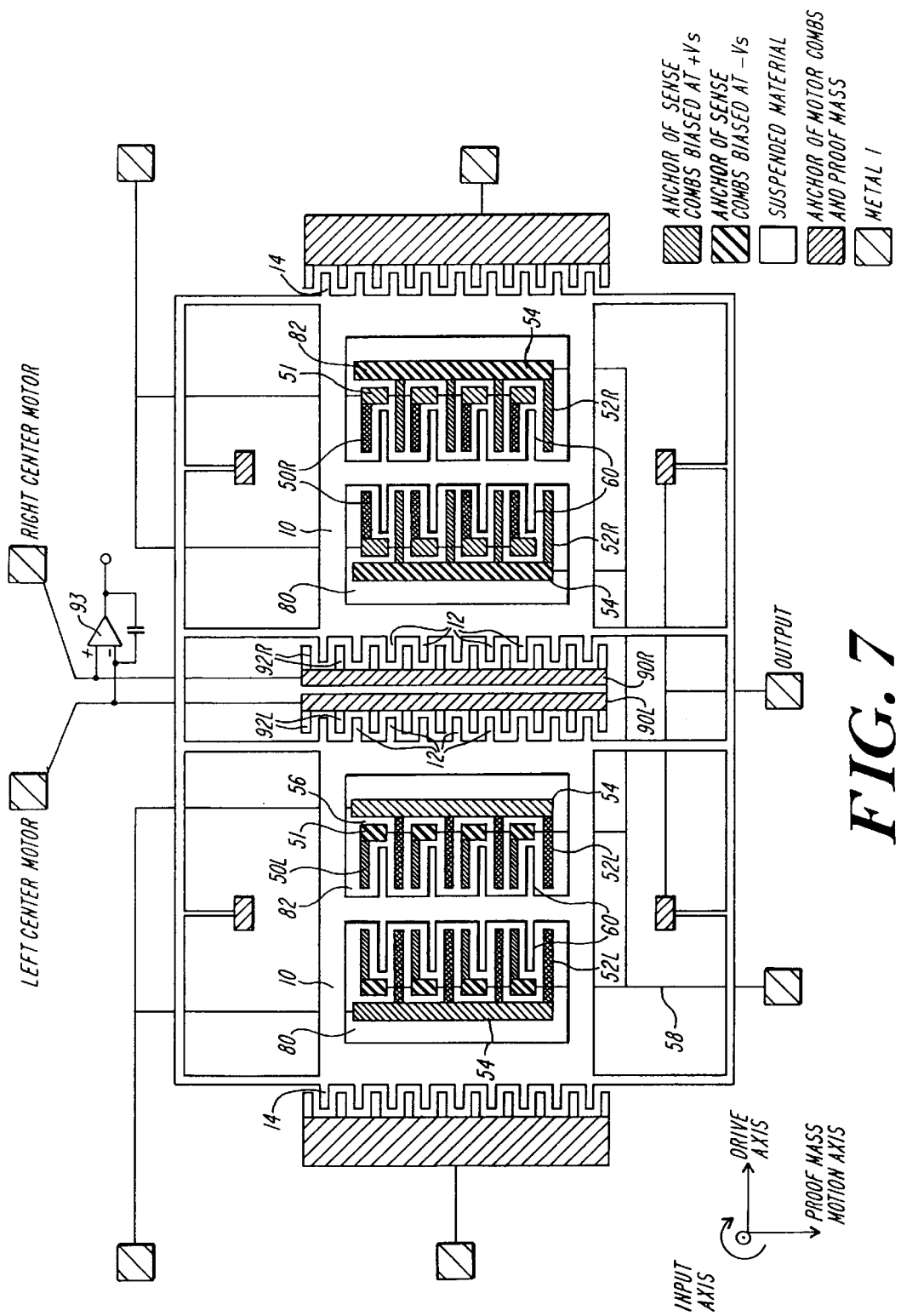
FIGS. 7–10 are schematic diagrams of further embodiments of an out-of-plane tuning fork gyroscope according to the present invention incorporating alternative capacitive readouts of FIGS. 4–6.

FIG. 7 shows a tuning fork gyroscope using the sense combs of FIG. 4. Dual combs 50L, 52L and 50R, 52R are formed within openings 80 and 82 in the proof masses 10. The combs 60 are formed in the proof masses 10 between the openings 80 and 82. Combs 50L and 50R are attached to the substrate at anchors 51, and combs 52L and 52R are attached to the substrate at anchors 54. Combs 50L and 52L are biased at positive voltages, and combs 50R and 52R are biased at negative voltages, or vice versa.

As also shown in FIG. 7, the center or inner motor can be split into two parts 90L and 90R. The split can be either vertical, as shown, or horizontal (i.e., creating vertically separated motor sections, with each section driving both proof masses 10). The combs 92L, 92R of the inner motor, which mesh with the combs 12 of the proof masses, sense the motion of the driven proof mass 10. The inner combs 92L and 92R are biased with DC voltages of opposite sign and the same magnitude. A differential, integrating amplifier 93 senses the signal across the split motor parts 90L and 90R. As the proof masses 10 are driven parallel to the combs 92L and 92R, electrical current flows into and out of the inner combs 92L and 92R. The integrating differential amplifier 93 senses the low-impedance voltage signal proportional to the proof masses' positions generated by the electrical current flow. The split, rather than solid, inner combs 92L, 92R enable the use of separate biases of opposite polarity that results in an electrical anti-symmetry between motor parts 90L and 90R. This anti-symmetry causes any common mode signal which can cause gyroscope errors to be rejected by the differential action of integrating amplifier 93.

Figure 8:
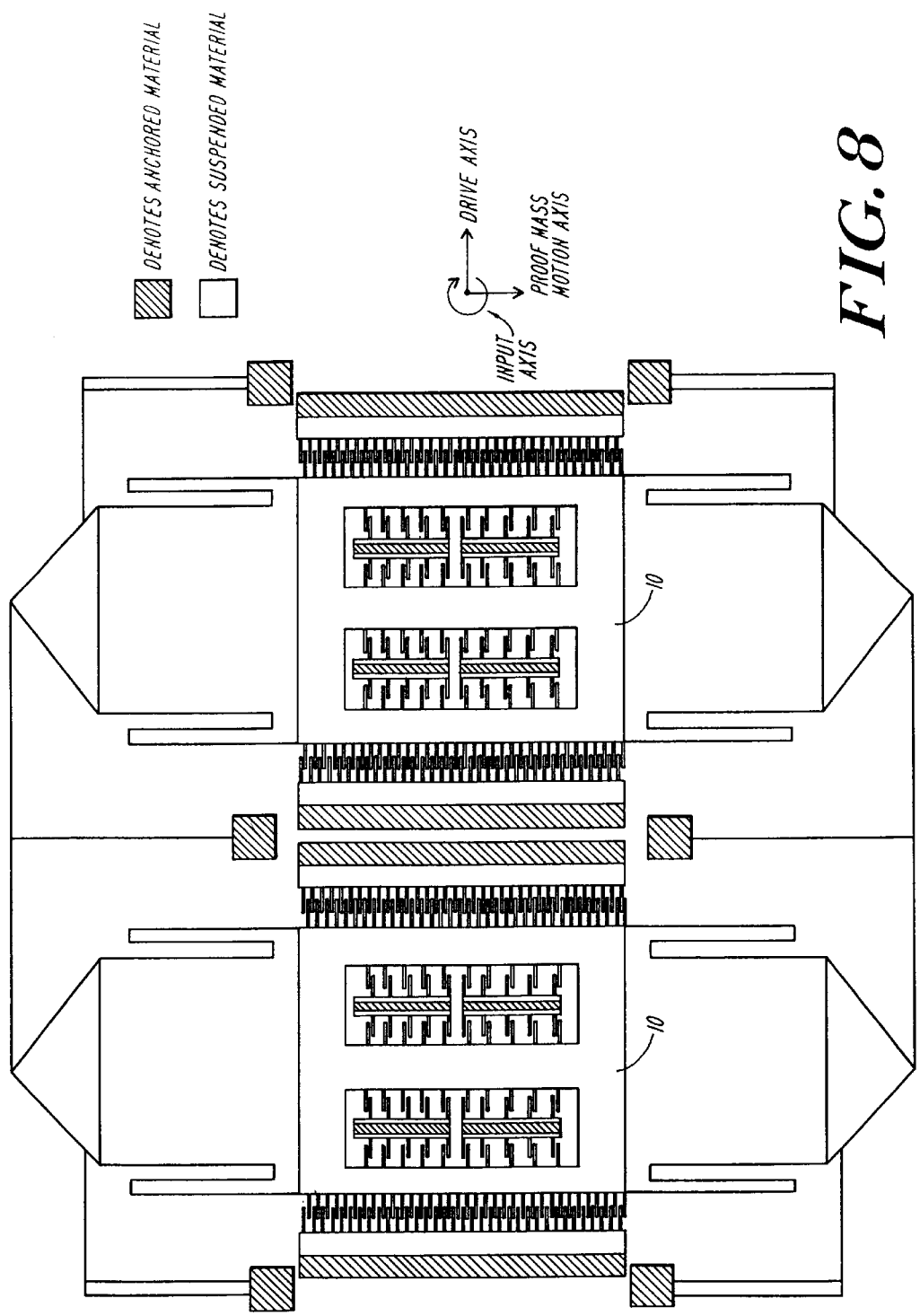
Figure 9:
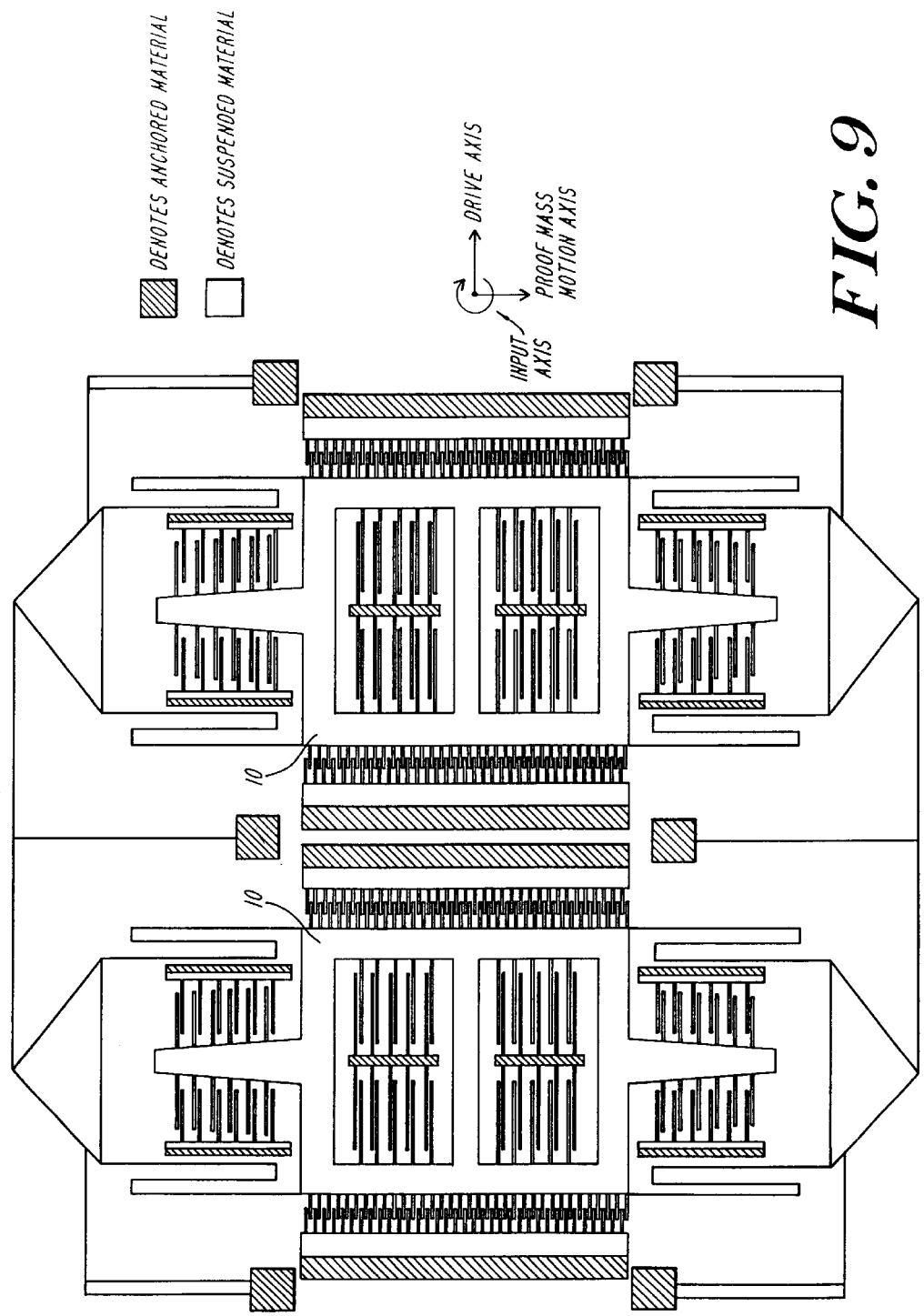
Figure 10:
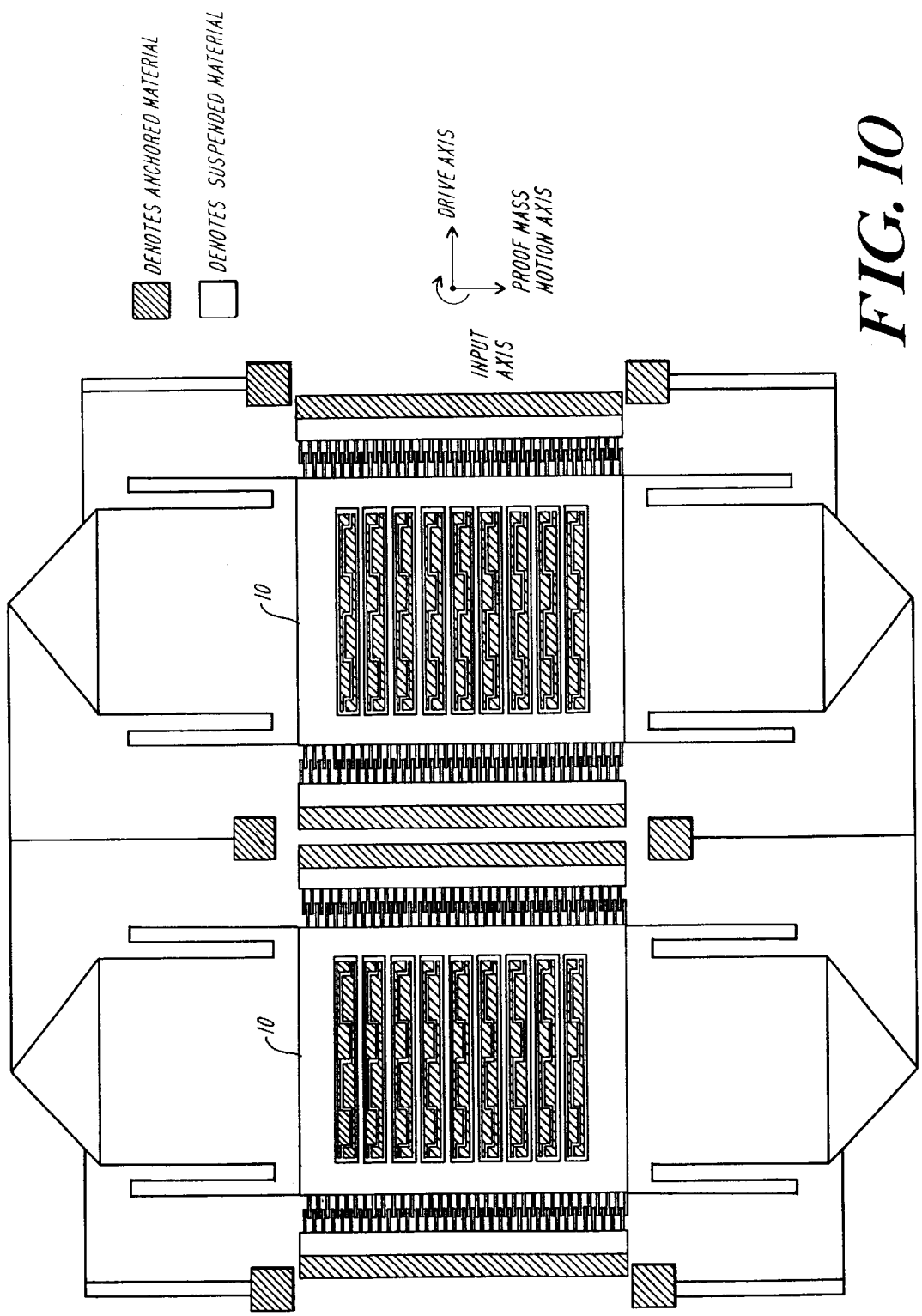

FIGS. 8–10 show additional alternative ways of configuring the sense combs. FIGS. 8 and 9 employ the unequal-gap structure of FIG. 5. In FIG. 8, the sense combs are located entirely within the boundaries of the proof masses 10, whereas in FIG. 9 additional sense combs are also placed outside the boundaries of the proof masses 10. FIG. 10 shows a variation of the internal comb-tooth structure of FIG. 6.

Figure 11:
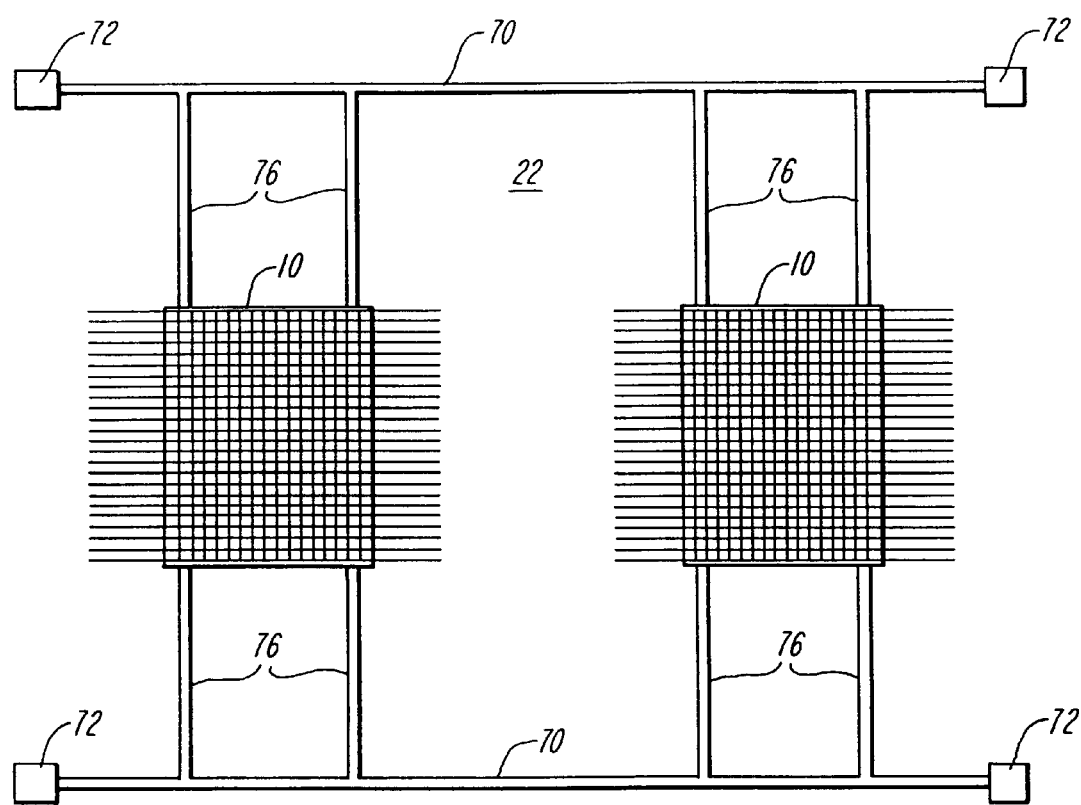
FIGS. 11–14 are schematic diagrams of further embodiments of an out-of-plane tuning fork gyroscope according to the present invention incorporating alternative suspension configurations.

An alternative suspension configuration for both the striped capacitor readout gyroscope of FIG. 2 and the dual function comb gyroscope of FIG. 7 is illustrated schematically in FIG. 11. In the illustrated configuration, two cross beams 70 are fixed to the substrate 22 at anchors 72. The proof masses 10 are suspended from the beams 70 by flexures 76. Other forms of suspension are also possible. In addition, the number of leads and bonding pads from the sense combs can vary. For example, although four bonding pads are shown in FIG. 7, a separate bonding pad for each row of sense combs, that is, eight bonding pads, could be used. In another option, all positive voltage combs can be connected to one sense pad; two, three, or four pads could be used for the negative combs. These options provide compensation against quadrature and allow for a continuous guard plane beneath the proof mass.

Figure 12:
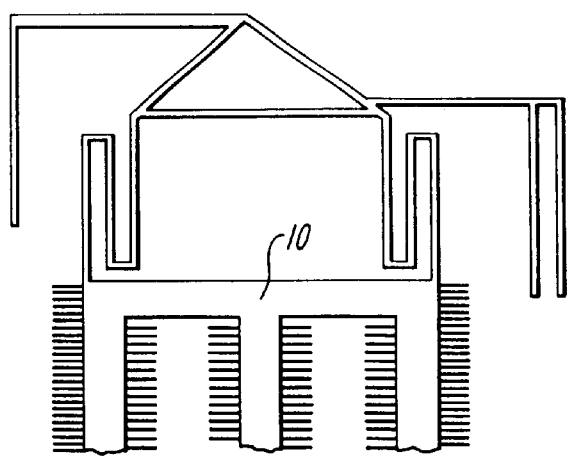
Figure 13:
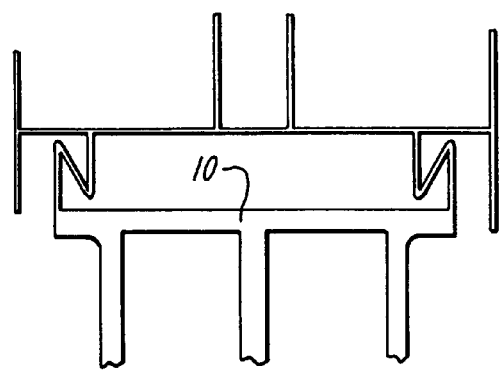
Figure 14:
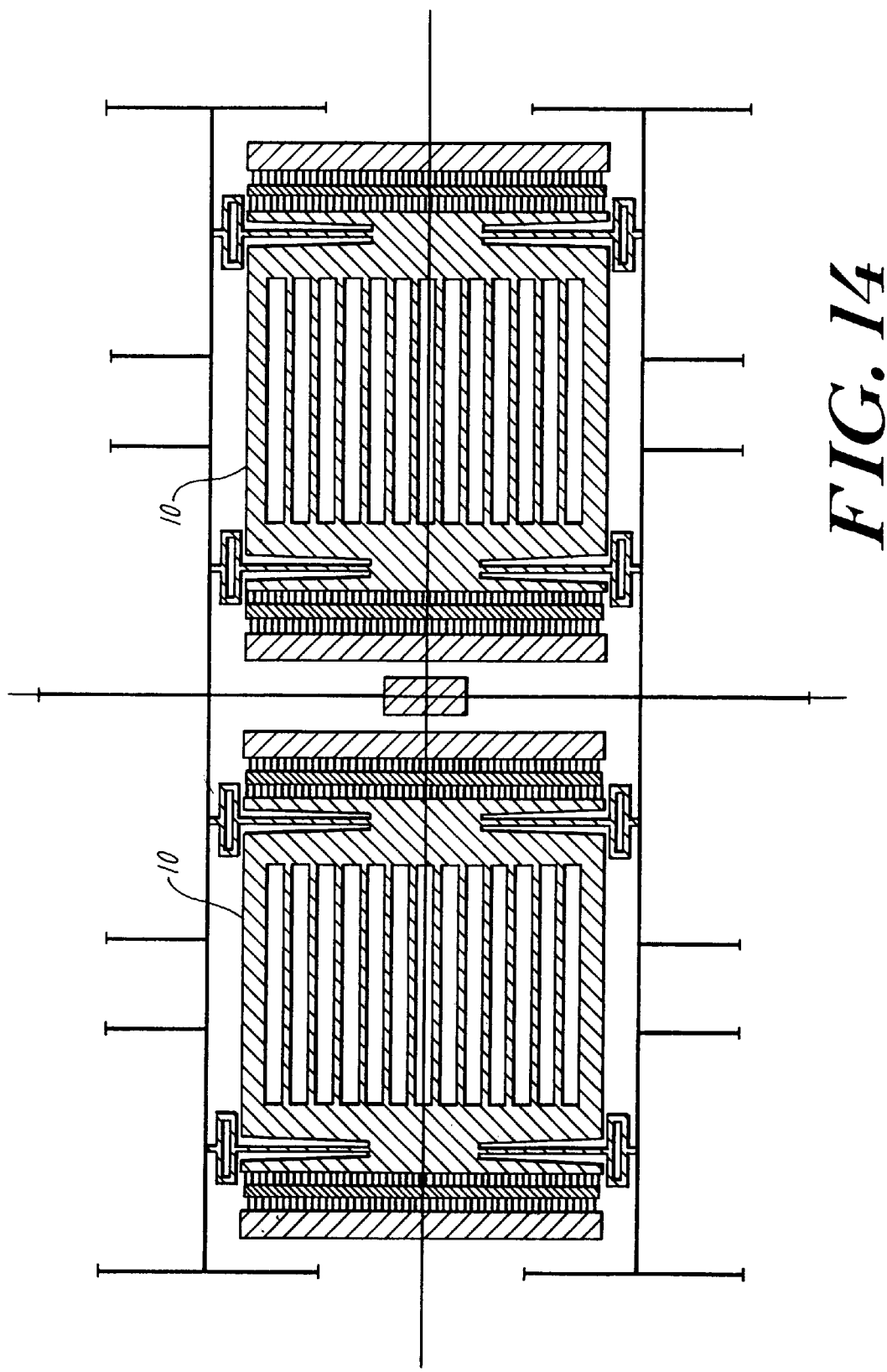

FIGS. 12–14 show alternative suspension configurations for out-of-plane gyroscopes. FIGS. 12 and 13 show one quarter of a complete structure including proof-mass and springs, and FIG. 14 shows a complete structure. In the gyroscope of FIG. 14, the flexures attached to the proof mass 10 are disposed in elongated cutouts, and attached to the proof masses 10 at the innermost region of the cutout. This configuration makes for an area-efficient design.

Figure 15:
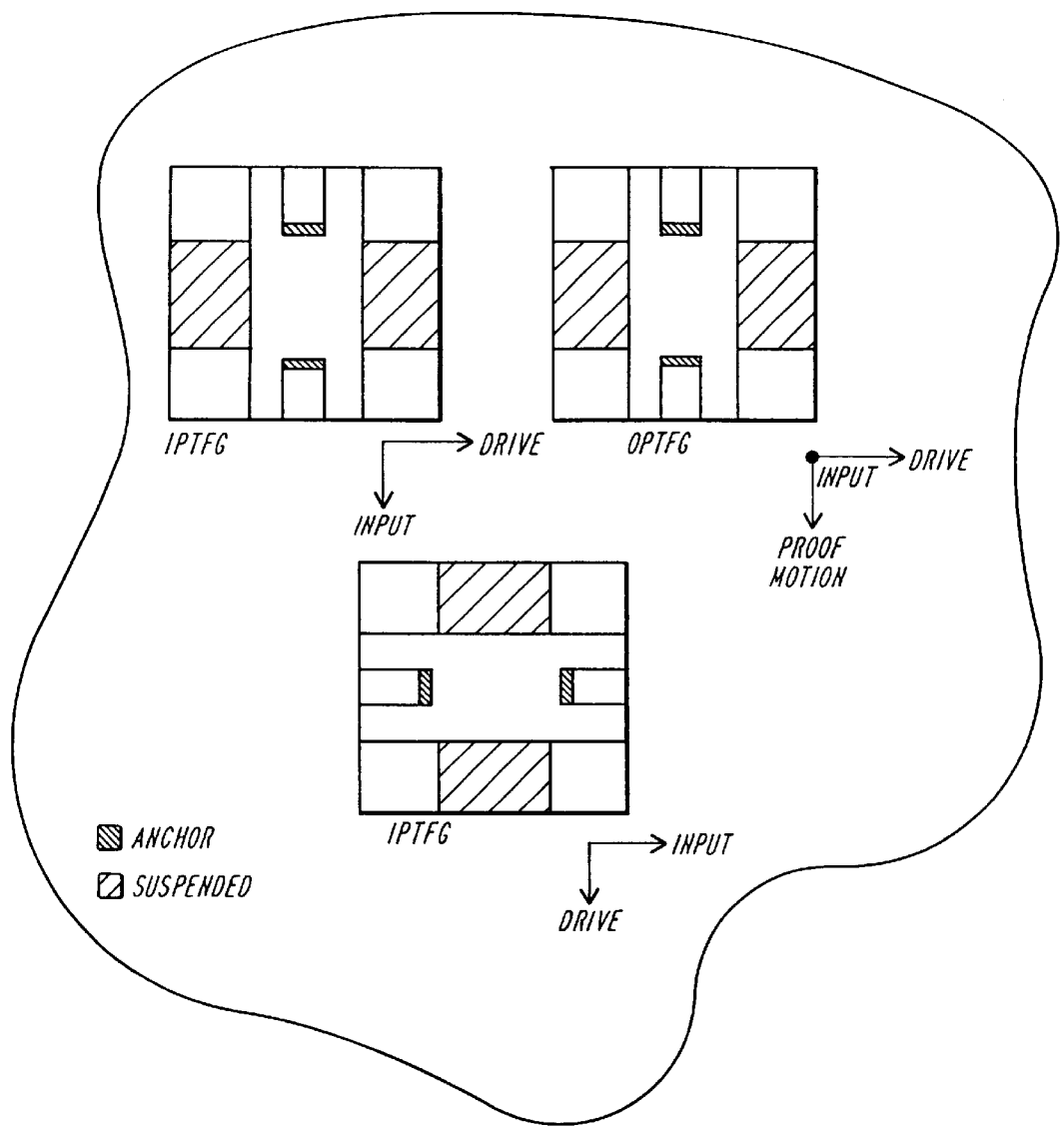
FIG. 15 is a schematic view of a three-axis inertial measurement unit incorporating two in-plane tuning fork gyroscopes and an out-of-plane tuning fork gyroscope according to the present invention.

An out-of-plane tuning fork gyroscope can be used as a single sensor or in combination with two in-plane tuning fork gyroscopes as a three-axis inertial measurement unit for automotive, military, medical, and computer game applications. The out-of-plane tuning fork gyroscopes illustrated herein can be made by the same process used for the prior-art in-plane tuning fork gyroscope of FIG. 1. Thus, a three-axis inertial measurement unit can be constructed from a single wafer or on a single chip, as is shown schematically in FIG. 15. The devices can be fabricated, for example, according to a dissolved wafer process, various silicon-on-insulator (SOI) processes, or by a surface-micromachining polysilicon process. Fabrication via etching of bulk silicon is also possible.

It will be apparent to those skilled in the art that modification to and variation of the above-described methods and apparatus are possible without departing from the inventive concepts disclosed herein. Accordingly, the invention should be viewed as limited solely by the scope and spirit of the appended claims.

We claim:

1. A microfabricated tuning fork structure comprising:
   a substrate defining a major plane;
   first and second proof masses supported by the substrate, the proof masses being supported in a manner allowing for driven vibration of the proof masses in opposite directions along a first axis parallel to the major plane and also allowing for translation of the proof masses along a second axis parallel to the major plane and oriented differently from the first axis, the translation occurring in response to an angular input with respect to an axis out of the major plane when the proof masses are being vibratingly driven along the first axis;
   a drive structure in electrical communication with the proof masses to cause the proof masses to vibrate along the first axis while allowing for motion along the second axis; and
   sense electrodes supported by the substrate, the sense electrodes being in spaced relation to and cooperatively configured with the proof masses to establish respective capacitances therewith that vary with axial motion of the proof masses along the second axis, the sense electrodes and the proof masses being further configured to enable the detection of differential variation of the capacitances in response to differential axial motion of the proof masses along the second axis.

2. The microfabricated tuning fork structure of claim 1, wherein each proof mass includes electrodes extending therefrom, and wherein the sense electrodes are supported by the substrate to mesh with the extending electrodes.

3. The microfabricated tuning fork structure of claim 2, wherein the sense electrodes comprise pairs of electrodes, the electrodes of each of the pair being electrically driven 180° out of phase with each other.

4. The microfabricated tuning fork structure of claim 2, wherein the extending electrodes extend between the electrodes of each of the pairs of sense electrodes.

5. The microfabricated tuning fork structure of claim 2, wherein the proof masses each include an opening therein, the extending electrodes extending into the openings, the sense electrodes supported by the substrate within the openings.

6. The microfabricated tuning fork structure of claim 2, wherein the sense electrodes are in electrical communication with a drive system which provides a voltage on the sense electrodes at a drive resonance of the proof masses.

7. The microfabricated tuning fork structure of claim 2, wherein the sense electrodes are in electrical communication with a drive system which provides a voltage on the sense electrodes to provide a frequency different from a drive resonance of the proof masses.

8. The microfabricated tuning fork structure of claim 2, wherein the sense electrodes and the electrodes extending from the proof masses mesh such that unequal air gaps exist between each sense electrode and two adjacent electrodes extending from the corresponding proof mass with which the sense electrode meshes.

9. The microfabricated tuning fork structure of claim 8, wherein the electrodes extending from the proof masses and the sense electrodes form corresponding combs.

10. The microfabricated tuning fork structure of claim 8, wherein the sense electrodes are arranged as parallel elongated strips, and further comprising a conductive lead electrically interconnecting the strips.

11. The microfabricated tuning fork structure of claim 1, wherein the sense electrodes comprise parallel strips supported by the substrate in opposition to the proof masses, the strips extending parallel to the first axis.

12. The microfabricated tuning fork structure of claim 11, wherein each of the proof masses have a plurality of apertures disposed therethrough, and wherein the strips are arranged in pairs, one of the strips of each pair being electrically excitable 180° out of phase with respect to another of the strips of each pair.

13. The microfabricated tuning fork structure of claim 12, wherein the pairs of strips have a first pitch and the apertures have a second pitch substantially equal to the first pitch.

14. The microfabricated tuning fork structure of claim 12, wherein edges of the apertures lie over the strips of each pair of strips.

15. The microfabricated tuning fork structure of claim 1, wherein each proof mass has regions of conductivity bordering regions of substantially no conductivity, the no-conductivity regions being disposed in opposition to the plurality of sense electrodes in a linear formation of a first selected pitch, and wherein the sense electrodes being disposed in a linear formation having a second selected pitch substantially the same as the first selected pitch.

16. The microfabricated tuning fork structure of claim 15, wherein the regions of substantially no conductivity comprise apertures through the proof masses.

17. The microfabricated tuning fork structure of claim 1, wherein the drive structure includes a comb drive comprising first driven electrodes extending from the proof masses and second drive electrodes extending from the substrate and meshing with the first driven electrodes.

18. The microfabricated tuning fork structure of claim 17, the drive structure further including first and second pluralities of drive sense electrodes extending from the substrate at a region between the proof masses and meshing with further driven electrodes extending from the proof masses.

19. The microfabricated tuning fork structure of claim 18, wherein the first and second pluralities of drive sense electrodes extend from the substrate at first and second separated anchor regions.

20. The microfabricated tuning fork structure of claim 1, wherein the proof masses are supported on the substrate by a suspension comprising:
   two beams, the beams being disposed on opposite sides of the proof masses;
   first flexural members connecting the beams to anchors on the substrate; and
   second flexural members connecting the proof masses to the beams.

21. The microfabricated tuning fork structure of claim 1, wherein the proof masses are supported on the substrate by a suspension comprising:
   two beams, the beams being anchored to the substrate on opposite sides of the proof masses; and
   flexural members connecting the proof masses to the beams.

22. The microfabricated tuning fork structure of claim 1, wherein the proof masses are supported on the substrate by a suspension comprising flexural members disposed within corresponding cutouts in the proof masses, each flexural member being attached to the corresponding proof mass at an innermost region of the cutout within which the flexural member is disposed.

23. The microfabricated tuning fork structure of claim 1, wherein the proof masses are arranged side by side, and wherein the proof masses are supported on the substrate by a suspension comprising substantially identical flexural members attached to each proof mass, the flexural members being arranged at the tops and bottoms of the proof masses and being attached to corresponding anchors on the substrate at the tops and bottoms of the proof masses.

24. The microfabricated tuning fork structure of claim 1, wherein the second axis is orthogonal to the first axis.

25. The microfabricated tuning fork structure of claim 1, wherein the out of plane axis is orthogonal to the major plane.

26. An inertial measurement system comprising:
   a substrate defining a major plane;
   a first in-plane tuning fork gyroscope supported by the substrate comprising:
      first and second proof masses suspended for vibratory motion along a first axis parallel to the major plane and rotation about a second axis orthogonal to the first axis,
      a first drive structure in electrical communication with the first and second proof masses to cause vibration thereof along the first axis, and
      a first sensor structure disposed to sense rotation of the first and second proof masses about the second axis;
   a second in-plane tuning fork gyroscope supported by the substrate and oriented angularly with respect to the first in-plane tuning fork gyroscope, comprising:
      third and fourth proof masses suspended for vibratory motion along a third axis parallel to the major plane and orthogonal to the first axis and for rotation about a fourth axis orthogonal to the third axis,
      a second drive structure in electrical communication with the third and fourth proof masses to cause vibration along the third axis, and
      a second sensor structure disposed to sense rotation of the third and fourth proof masses about the fourth axis; and
   an out-of-plane tuning fork gyroscope supported by the substrate comprising:
      fifth and sixth proof masses suspended for vibratory motion along a fifth axis parallel to the major plane and translation along a sixth axis parallel to the major plane and angled with respect to the fifth axis,
      a third drive structure in electrical communication with the fifth and sixth proof masses to cause vibration along the fifth axis,
      a third sensor structure disposed to sense translation of the fifth and sixth proof masses along the sixth axis.

27. The inertial measurement system of claim 26, wherein the third sensor structure of the out-of-plane tuning fork gyroscope includes:
   sense electrodes supported by the substrate, the sense electrodes provided in pairs, the electrodes of each pair being electrically driven 180° out of phase with respect to each other; and
   electrodes extending from the fifth and sixth proof masses, each ex tending electrode disposed to mesh between the electrodes of an associated one of the pairs of sense electrodes.

28. The inertial measurement system of claim 26, wherein the third sensor structure of the out-of-plane tuning fork gyroscope includes:
   sense electrodes comprising parallel strips supported by the substrate in opposition to the first and second proof masses and arranged in pairs extending parallel to the fifth axis, one strip of each pair being electrically excitable 180° out of phase with respect to another of the strips of each pair; and
   apertures disposed through the fifth and sixth proof masses, edges of the apertures disposed to lie over the strips of each pair.

29. The inertial measurement system of claim 26, wherein the first, second, and third drive structures each include a comb drive comprising first driven electrodes extending from an associated one of the first, second, third, fourth, fifth, and sixth proof masses, and second drive electrodes extending from the substrate and meshing with the first driven electrodes.

30. The inertial measurement system of claim 26, wherein the first in-plane tuning fork gyroscope, the second in-plane tuning fork gyroscope, and the out-of-plane tuning fork gyroscope are provided on a single wafer.

31. The inertial measurement system of claim 26, wherein the first in-plane tuning fork gyroscope, the second in-plane tuning fork gyroscope, and the out-of-plane tuning fork gyroscope are provided on a single chip.

32. The inertial measurement system of claim 26, wherein the frequency of vibration of the first and second proof masses along the first axis is sufficiently different from the frequency of vibration of the third and fourth proof masses along the third axis and both of these vibration frequencies are sufficiently different from the frequency of vibration of the fifth and sixth proof masses along the sixth axis so that cross talk between the three gyroscopes is substantially avoided.

33. The inertial measurement system of claim 32, wherein the difference in the respective frequencies of vibration is due to a difference between the mass of the first and second proof masses and the mass of the fifth and sixth proof masses.

34. The inertial measurement system of claim 32, wherein the difference in the respective frequencies of vibration is due to a difference between the spring constant of the suspension for the first and second proof masses and the spring constant for the suspension of the third and fourth proof masses and the spring constant for the suspension of the fifth and sixth proof masses.

* * * * *

UNITED STATES PATENT AND TRADEMARK OFFICE
CERTIFICATE OF CORRECTION

PATENT NO. : 6,257,059 B1  
DATED : July 10, 2001  
INVENTOR(S) : Marc S. Weinberg et al.

It is certified that error appears in the above-identified patent and that said Letters Patent is hereby corrected as shown below:

Title page,  
Item [75], Inventors, "Gregory A. Kirkos, Somerville;" should read -- Gregory A. Kirkos, Melrose; --;

Column 5,  
Line 1, "$L_p$~10$\mu$m and h~3$\mu$m" should read -- $L_p \approx 10\mu$m and h$\approx 3\mu$m --.

Signed and Sealed this

Twenty-seventh Day of August, 2002

Attest:

JAMES E. ROGAN  
*Attesting Officer*  *Director of the United States Patent and Trademark Office*